(12) United States Patent
Rensburg (10) Patent No.: US 11,930,052 B1
(45) Date of Patent: Mar. 12, 2024

(54) SYSTEMS AND METHODS FOR DETERMINING A CONFERENCE DEPARTURE IMPACT

(71) Applicant: RingCentral, Inc., Belmont, CA (US)

(72) Inventor: Christopher van Rensburg, Portland, OR (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 18/129,721

(22) Filed: Mar. 31, 2023

(51) Int. Cl.
*H04L 65/1093* (2022.01)
*H04L 12/18* (2006.01)
*H04L 65/1089* (2022.01)

(52) U.S. Cl.
CPC ...... *H04L 65/1093* (2013.01); *H04L 12/1818* (2013.01); *H04L 65/1089* (2013.01)

(58) Field of Classification Search
CPC ............ H04L 67/1093; H04L 12/1818; H04L 65/1089
See application file for complete search history.

(56) References Cited

U.S. PATENT DOCUMENTS

2022/0086393 A1\* 3/2022 Peters .................. G06V 20/41

FOREIGN PATENT DOCUMENTS

CN 113259138 A \* 8/2021
JP 3849924 B2 \* 11/2006

\* cited by examiner

*Primary Examiner* — Suraj M Joshi (57) ABSTRACT

A computer-implemented method for improving conference session management is provided. The method comprises determining a participation level for a participant during a conference session, determining a presence expectation for the participant during the conference session, in response to determining the participation level and the presence expectation for the participant, evaluating an impact of the participant departing the conference session, and in response to determining that that the impact exceeds a threshold, sending a departure notification corresponding to a departure of the participant.

20 Claims, 6 Drawing Sheets

500

502
DETERMINING A PARTICIPATION LEVEL FOR A PARTICIPANT DURING A CONFERENCE SESSION

504
DETERMINING A PRESENCE EXPECTATION FOR THE PARTICIPANT DURING THE CONFERENCE SESSION

506
IN RESPONSE TO DETERMINING THE PARTICIPATION LEVEL AND THE PRESENCE EXPECTATION FOR THE PARTICIPANT, EVALUATING AN IMPACT OF THE PARTICIPANT DEPARTING THE CONFERENCE SESSION

508
IN RESPONSE TO DETERMINING THAT THAT THE IMPACT EXCEEDS A THRESHOLD, SENDING A DEPARTURE NOTIFICATION CORRESPONDING TO A DEPARTURE OF THE PARTICIPANT

SYSTEMS AND METHODS FOR DETERMINING A CONFERENCE DEPARTURE IMPACT

TECHNICAL FIELD

The present disclosure relates generally to the field of conferencing. Specifically, the present disclosure relates to systems and methods for determining an impact on conferences when a conference participant leaves.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Virtual conferences have become standard methods of communication for both professional and personal meetings. However, any number of factors may cause interruptions to a virtual meeting that results in the unexpected departure of an important participant. For example, a speaker may be double booked and is forced to leave a virtual conference early to attend a conflicting meeting. In some cases, a speaker is forced to leave the conference to address an unexpected emergency situation. In these instances, other participants may not know of the speaker's departure, resulting in confusion and lost productivity. Moreover, valuable conferencing resources are often wasted trying to determine whether key participants are still in attendance and/or whether these participants will join later. Therefore, there is a need for improving upon existing conferencing techniques by intelligently evaluating the impact of a participant's departure on a conference.

SUMMARY

The appended claims may serve as a summary of the invention.

DETAILED DESCRIPTION

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood that terms "user" and "participant" have equal meaning in the following description. Embodiments are described in sections according to the following outline:

1.0 GENERAL OVERVIEW
2.0 STRUCTURAL OVERVIEW
3.0 FUNCTIONAL OVERVIEW
4.0 PROCEDURAL OVERVIEW 1.0 General Overview In some instances, a participant in a virtual conference session, such as an audio or video conference, may need to depart early, such as to attend another meeting or perform some other scheduled activity, even while the session is scheduled to continue for longer or is to extend beyond the originally scheduled duration. Meanwhile, the other participants remain in the conference session, often without knowledge of the departure. This causes confusion among the remaining participants as to why the participant left. For example, some participants may question if the absence was unintentionally caused by problems with internet connectivity or the conferencing device, and therefore a temporary absence that could be rectified as opposed to an intentional, long-term departure. The remaining participants may be especially concerned if the absent participant is a key speaker whose participation is essential to achieving the conference session's objective. In some instances, an early departure of a participant may not even be noticed by other participants. For example, in the case of a video conference, if one participant is screen sharing, the other participants viewing the shared screen may not be able to see all the participants simultaneously in the available gallery, film strip, or sidebar layouts. Consequently, the missing key participant's absence may not be noticed until that key participant's input is needed, which causes confusion and delays.

In other cases, the participant departing the session may post a message explaining their departure using a text chat feature of the video conferencing service so as to not interrupt a currently active speaker. However, the remaining participants may not notice the notification regarding the message in the user interface of the video conferencing service's client application. Furthermore, the video conference service may not prompt a participant who is departing a session early regarding whether they would like to leave an explanatory message for those remaining in the session. In some instances, these unexplained absences cause participants to waste conferencing resources on trying to determine whether the absent participant is, in fact, still in attendance, whether the absent participant will rejoin later, or whether the absent participant has left with no intention of returning.

A system is needed to improve overall conferencing management. Specifically, a system is needed to better facilitate obtaining and/or determining an explanation for a participant's early departure from a virtual conferencing session and effectively conveying this information to those participants remaining in the session, as well as the fact of any participant's early departure from the session. The current disclosure provides a technological solution to the technological problem of wasted computing resources as a result of trying to determine whether a participant is present or absent and/or a reason for the participant's absence.

A computer-implemented method for improving conference session management is provided. The method comprises determining a participation level for a participant during a conference session; determining a presence expectation for the participant during the conference session; in response to determining the participation level and the presence expectation for the participant, evaluating an impact of the participant departing the conference session; and in response to determining that that the impact exceeds a threshold, sending a departure notification corresponding to a departure of the participant.

A non-transitory, computer-readable medium storing a set of instructions is also provided. In an example embodiment, when the instructions are executed by a processor, the instructions cause determining a participation level for a participant during a conference session; determining a presence expectation for the participant during the conference session; in response to determining the participation level and the presence expectation for the participant, evaluating an impact of the participant departing the conference session; and in response to determining that that the impact exceeds a threshold, sending a departure notification corresponding to a departure of the participant.

A system for improving conference session management is also provided. The system includes a processor and a memory storing instructions that, when executed by the processor, cause determining a participation level for a participant during a conference session; determining a presence expectation for the participant during the conference session; in response to determining the participation level and the presence expectation for the participant, evaluating an impact of the participant departing the conference session; and in response to determining that that the impact exceeds a threshold, sending a departure notification corresponding to a departure of the participant.

2.0 Structural Overview

Figure 1:
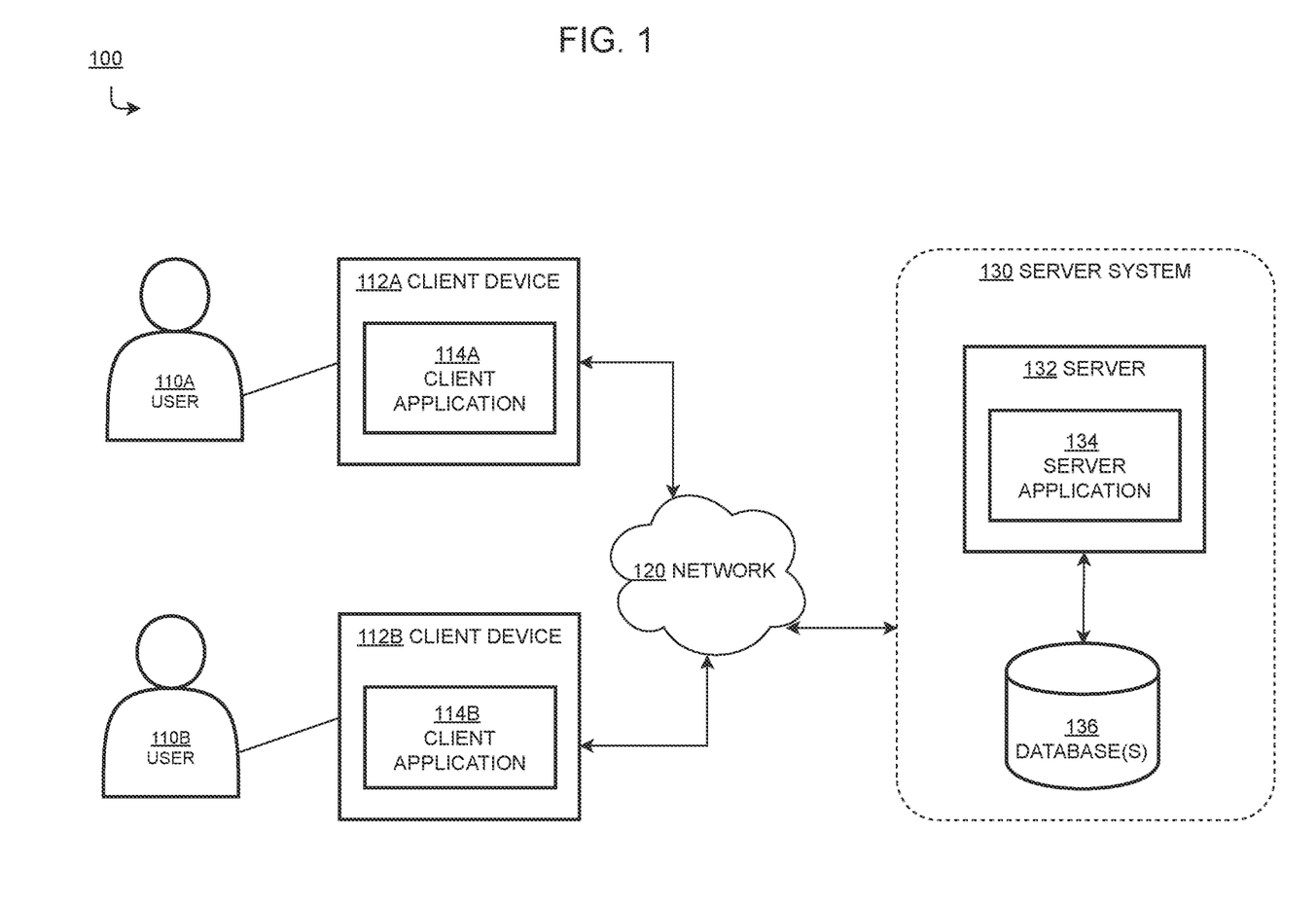
FIG. 1 is a network diagram depicting a networked collaboration system, in an example embodiment.

FIG. 1 shows an example collaboration system 100 in which various implementations as described herein may be practiced. The collaboration system 100 enables a plurality of users to collaborate and communicate through various means, including audio and/or video conference sessions, virtual reality (VR), augmented reality (AR), email, instant message, SMS and MMS message, transcriptions, closed captioning, or any other means of communication. In some examples, one or more components of the collaboration system 100, such as client device(s) 112A, 112B and server 132, can be used to implement computer programs, applications, methods, processes, or other software to perform the described techniques and to realize the structures described herein. In an embodiment, the collaboration system 100 comprises components that are implemented at least partially by hardware at one or more computing devices, such as one or more hardware processors executing program instructions stored in one or more memories for performing the functions that are described herein.

As shown in FIG. 1, the collaboration system 100 includes one or more client device(s) 112A, 112B that are accessible by users 110A, 110B, a network 120, a server system 130, a server 132, and a database 136. The client devices 112A, 112B are configured to execute one or more client application(s) 114A, 114B, that are configured to enable communication and collaboration between the client devices 112A, 112B and the server 132. In some embodiments, the client applications 114A, 114B are web-based applications that enable connectivity through a browser, such as through Web Real-Time Communications (WebRTC). The server 132 is configured to execute a server application 134, such as a server back-end that facilitates communication and collaboration between the server 132 and the client devices 112A, 121B. In some embodiments, the server 132 is a WebRTC server. The server 132 may use a Web Socket protocol, in some embodiments. The components and arrangements shown in FIG. 1 are not intended to limit the disclosed embodiments, as the system components used to implement the disclosed processes and features can vary.

As shown in FIG. 1, users 110A, 110B may communicate with the server 132 and each other using various types of client devices 112A, 112B via network 120. As an example, client devices 112A, 112B may include a display such as a television, tablet, computer monitor, video conferencing console, or laptop computer screen. Client devices 112A, 112B may also include video/audio input devices such as a microphone, video camera, web camera, or the like. As another example, client device 112A, 112B may include mobile devices such as a tablet or a smartphone having display and video/audio capture capabilities. In some embodiments, the client device 112A, 112B may include AR and/or VR devices such as headsets, glasses, etc. Client devices 112A, 112B may also include one or more software-based client applications that facilitate the user devices to engage in communications, such as instant messaging, text messages, email, Voice over Internet Protocol (VoIP) calls, video conferences, and so forth with one another. In some embodiments, the client application 114A, 114B may be a web browser configured to enable browser-based WebRTC conferencing sessions. In some embodiments, the systems and methods further described herein are implemented to separate speakers for WebRTC conferencing sessions and provide the separated speaker information to a client device 112A, 112B.

The network 120 facilitates the exchanges of communication and collaboration data between client device(s) 112A, 112B and the server 132. The network 120 may be any type of network that provides communications, exchanges information, and/or facilitates the exchange of information between the server 132 and client device(s) 112A, 112B. For example, network 120 broadly represents a one or more local area networks (LANs), wide area networks (WANs), metropolitan area networks (MANs), global interconnected internetworks, such as the public internet, public switched telephone networks ("PSTN"), or other suitable connection(s) or combination thereof that enables collaboration system 100 to send and receive information between the components of the collaboration system 100. Each such network 120 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 120 and the disclosure presumes that all elements of FIG. 1 are communicatively coupled via network 120. A network may support a variety of electronic messaging formats and may further support a variety of services and applications for client device(s) 112A, 112B.

The server system 130 can be a computer-based system including computer system components, desktop computers, workstations, tablets, hand-held computing devices, memory devices, and/or internal network(s) connecting the components. The server 132 is configured to provide communication and collaboration services, such as telephony, audio and/or video conferencing, VR or AR collaboration, webinar meetings, messaging, email, project management, or any other types of communication between users. The server 132 is also configured to receive information from client device(s) 112A, 112B over the network 120, process the unstructured information to generate structured information, store the information in a database 136, and/or transmit the information to the client devices 112A, 112B over the network 120. For example, the server 132 may be configured to receive physical inputs, video signals, audio signals, text data, user data, or any other data, analyze the received information, determine a participation level of the users 110A, 110B associated with client devices 112A, 112B, determine a presence expectation for the users 110A, 110B, evaluating an impact of a user 110A, 110B departing the conference session, determining whether that impact exceeds a threshold, and sending a departure notification.

In some implementations, the functionality of the server 132 described in the present disclosure is distributed among one or more of the client devices 112A, 112B. For example, one or more of the client devices 112A, 112B may perform functions such as processing conferencing data for the purposes of evaluating an impact of a participant departing the conference. In some embodiments, the client devices 112A, 112B may share certain tasks with the server 132.

Database(s) 136 may include one or more physical or virtual, structured or unstructured storages coupled with the server 132. The database 136 may be configured to store a variety of data. For example, the database 136 may store communications data, such as audio, video, text, or any other form of communication data. The database 136 may also store security data, such as access lists, permissions, and so forth. The database 136 may also store internal user data, such as names, positions, organizational charts, etc., as well as external user data, such as data from as Customer Relation Management (CRM) software, Enterprise Resource Planning (ERP) software, project management software, source code management software, or any other external or third-party sources. In some embodiments, the database 136 may also be configured to store processed audio data, video data, text data, machine learning (ML) training data, or any other data. In some embodiments, the database 136 may be stored in a cloud-based server (not shown) that is accessible by the server 132 and/or the client devices 112A, 112B through the network 120.

While the database 136 is illustrated as an external device connected to the server 132, the database 136 may also reside within the server 132 as an internal component of the server 132.

3.0 Functional Overview

Figure 2:
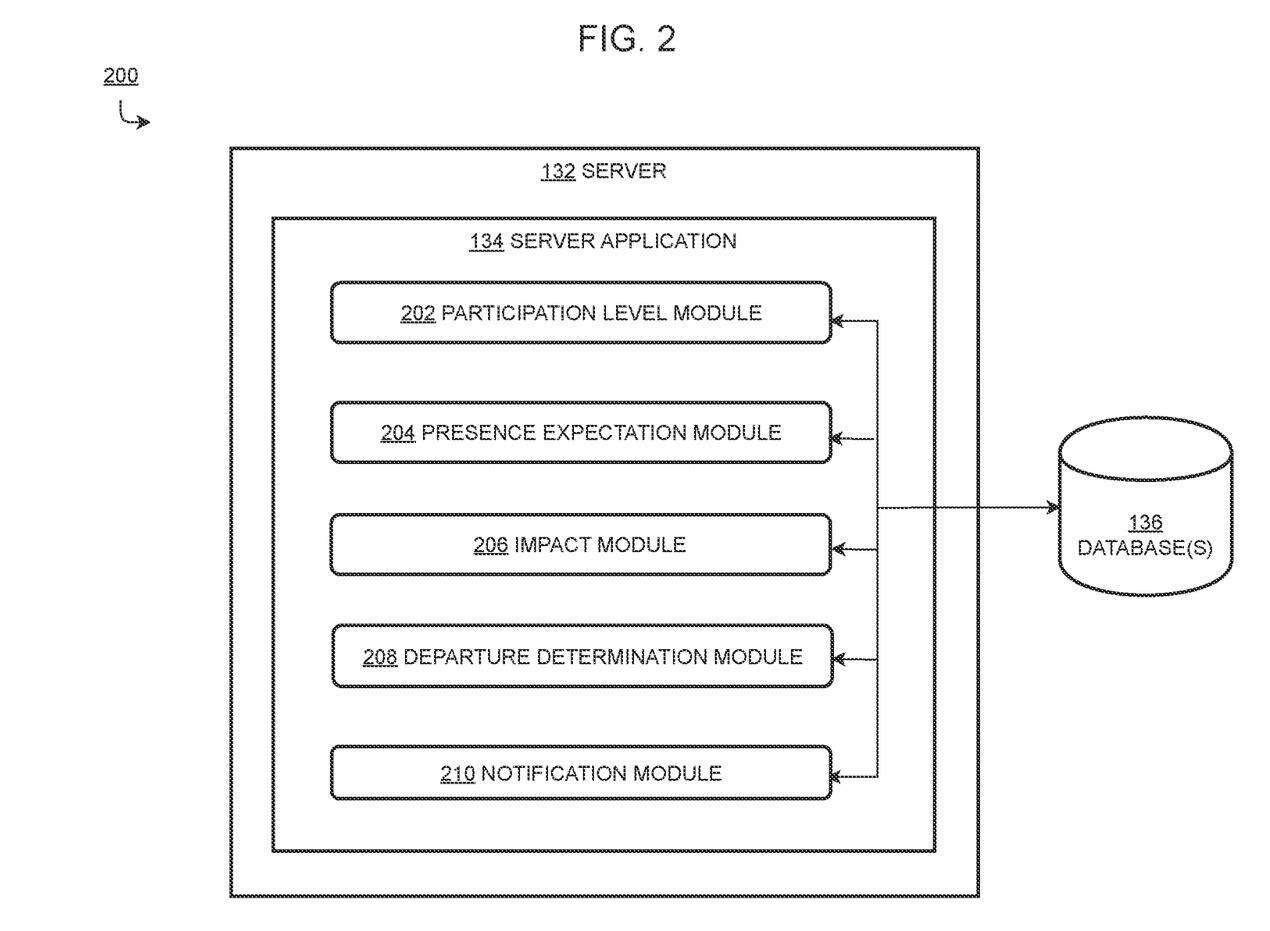
FIG. 2 is a diagram of a server system, in an example embodiment.

FIG. 2 is a diagram of a server system 200, such as server system 130 in FIG. 1, in an example embodiment. A server application 134 may contain sets of instructions or modules which, when executed by one or more processors, perform various functions related to evaluate an impact of participant departure and generate departure notification. In the example of FIG. 2, the server system 200 may be configured with a participation level module 202, a presence expectation module 204, an impact module 206, departure determination module 208, and a notification module 210, as further described herein. While five modules are depicted in FIG. 2, the embodiment of FIG. 2 serves as an example and is not intended to be limiting. For example, fewer modules or more modules serving any number of purposes may be used.

In some embodiments, the participation level module 202 determines a participant's participation level, such as the extent to which the participant has been actively engaged in the conference session. The participation level is determined using one or more historic factors and/or current factors, such as the number of times a speaker becomes an active speaker, the number of times a participant has spoken, the number of times the participant has been addressed, the amount of time or extent to which the participant has spoken or attracted the focus of the discussion, the amount of time or duration during which the participant has stepped away from a conference, the number of times or a duration during which the participant has shared their screen, and/or the number of messages exchanges. The participation level is determined using numerical weights for each factor, in some embodiments. In some instances, a lower weight is associated with a lower participation level and a higher weight is associated with higher participation level.

In some embodiments, the presence expectation module 204 determines an expectation, by the other participants, that a particular participant should remain in attendance or remain engaged in the conference session. The presence expectation is determined using one or more historical factors and/or current factors, such as statements or sentiments surrounding what a departing participant is expected to provide. The statements or sentiments may be made by the departing participant or the other remaining participants. The statements or sentiments may be evaluated using a trained ML algorithm and assign a numerical weight for each statement or sentiment, as further described herein. The numerical weights may be a number assigned between zero and one, between zero and five, or any other numerical scale. In some instances, a lower weight is associated with a lower presence expectation for the departing participant and a higher weight is associated with higher presence expectation for the departing participant.

In some embodiments, the impact module 206 determines an impact of the participant departing the conference session. The impact is determined by combining the participation level determined by the participation level module 202 with the presence expectation determined by the presence expectation module 204 to create an impact score. If the impact score exceeds a set threshold amount, then the impact is deemed high. If the impact score does not exceed a set threshold amount, then the impact is deemed low. In some embodiments, impact ranges may be provided (e.g. low, medium, high).

In some embodiments, the departure determination module 208 determines a likelihood of a participant leaving a conference session early using various types of historic and/or current data, including communication data, scheduling data, user input corresponding to attempts to leave a conference session, data corresponding to an actual departure, or any other types of data. In some embodiments, a numerical weight is assigned for each discrete event. The numerical weights may be a number assigned between zero and one, between zero and five, or any other numerical scale. In some instances, a lower weight is associated with a lower likelihood of a participant leaving the conference session while a higher weight is associated with a higher likelihood of a participant leaving the conference session. If the likelihood exceeds a threshold amount, then the likelihood is deemed high. If the likelihood does not exceed a set threshold amount, then the likelihood is deemed low.

In some embodiments, the notification module 210 sends a notification based on the impact determined by the impact module 206 and the departure determined by the departure determination module 208. The impact score determined by the impact module 206 is compared with its set threshold value. In some embodiments, the likelihood of a participant leaving is compared with its set threshold value. In some embodiments, if the impact score and the likelihood of leaving exceed their respective thresholds, then the notification module 210 sends a departure notification, as further described herein.

In some embodiments, database 136 may store data such as audio data, video data, text data, or any other data that may be used by one or more of the aforementioned modules to evaluate and determine a participation level, a presence expectation, an impact, and a departure/anticipated departure in order to generate a departure notification, as further described herein. In some embodiments, database 136 may store information from third parties, such as data accessible through communication integrations with third parties.

Figure 3:
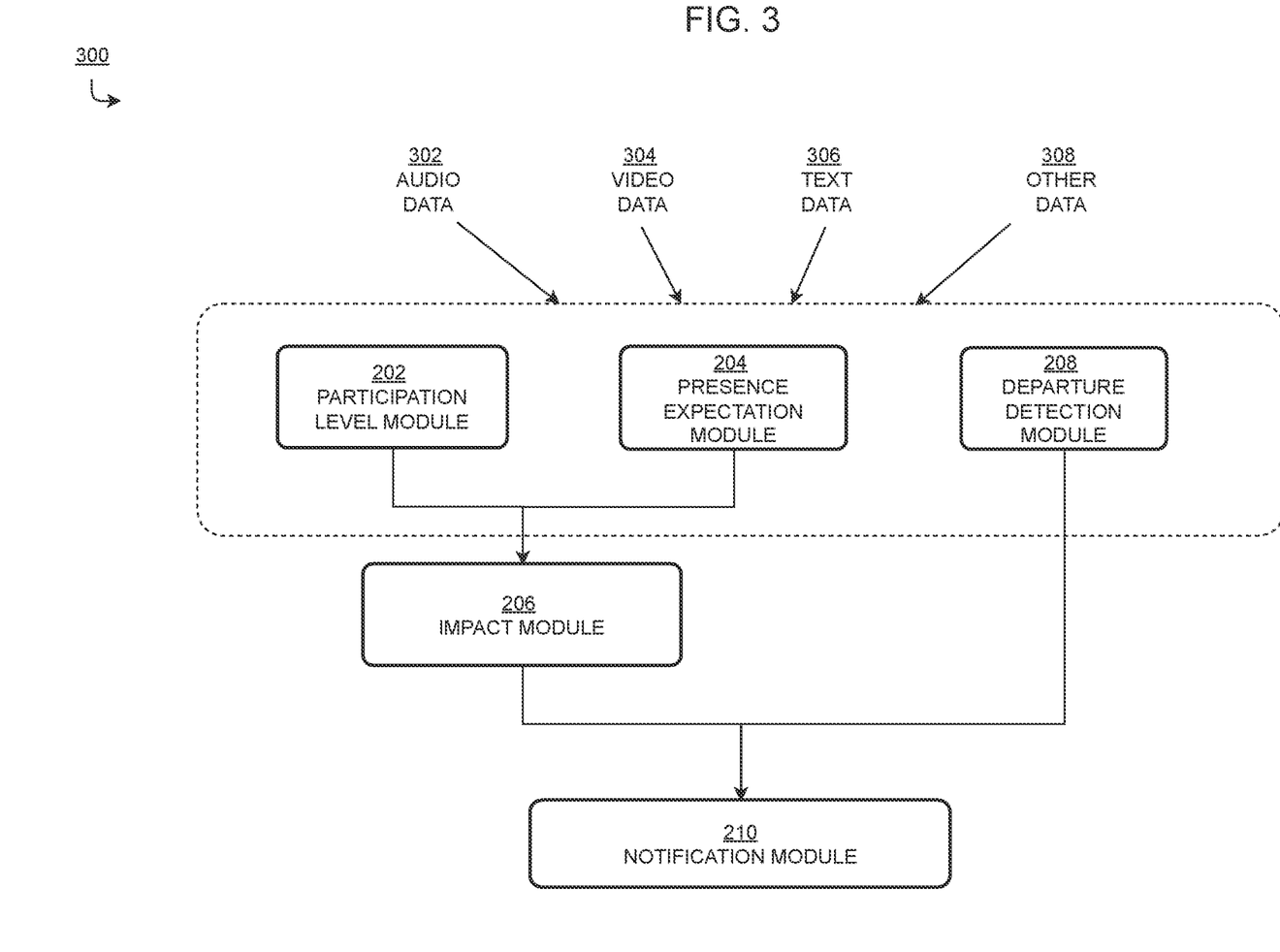
FIG. 3 is a block diagram of an impact determination process, in an example embodiment.

FIG. 3 illustrates a process 300 for determining an impact of a participant's departure from a conference, in an example embodiment. In some embodiments, the server 132 of FIG. 1 and FIG. 2 uses the participation level module 202 to determine an extent to which a participant has been actively participating or engaged during the session. This determination may be based on an analysis of prior or historic activity outside of the current conference session and/or current activities during the conference session, such as audio data 302, video data 304, text data 306, or any other data 308 from prior to or during the current session and between the current participants and/or non-participants. For example, server 132 may consider one or more of the following factors during a conference session: the number of separate times the participant has become the active speaker, the number of times and the amount of time that the participant has spoken, the number of times the participant has been addressed or referenced by name by other participants, the amount of time or extent to which that the participant has attracted the focus of other participants, the amount of time that the participant has stepped away from the device with which they are attending the session (wherein a higher amount of time spent away from the device indicates a lower degree of active participation or engagement), the number of times and amount of time that the participant has shared their screen, the number of messages that the participant has exchanged via chat with other participants of the session, or any other factor to determine an extent to which a participant has been engaged.

In some embodiments, any of the factors above may be considered within a historical context. For example, in the case of a recurring or reoccurring meeting, the number of times a particular participant has historically become an active speaker during previous sessions may be indicative of a likelihood that the same participant will be engaged during the current session.

In some embodiments, each of the factors may be associated with a numerical weight, such that a lower weight corresponds to a lower level of participant engagement while a higher weight corresponds to a higher level of participant engagement. In some embodiments, the weighted factors are averaged to generate an average weight corresponding to an overall level of participant engagement. The weighted factors or average weighted factors are subsequently used for calculating an impact of the participant's departure, as further described herein.

In some embodiments, the server 132 uses the presence expectation module 204 to determine whether a participant is expected by other participants to remain in the session. This determination may be based on an analysis of prior or historic activity outside of the current conference session and/or current activities during the conference session, such as audio data 302, video data 304, text data 306, or any other data 308 from prior to or during the current session and between the current participants and/or non-participants. For example, a participant may be expected to continue participating in the current conference session for the purposes of addressing questions, providing feedback, updates, explanations, approval, or rejection of conclusions or topics of discussion, and/or receiving important information on topics that may be covered during the remainder of the conferencing session.

In some embodiments, historical context may also be used. For example, in the case of a recurring or reoccurring meeting, directives that have historically been issued by a particular participant may be indicative of a likelihood that the same participant is expected to provide further directives during the current session.

In some embodiments, the presence expectation module 204 uses ML techniques, such as natural language processing (NLP) and/or sentiment analysis to identify the content of the discussion and/or the sentiment behind the words. For example, the audio data 302, video data 304, text data 306, or any other data 308 may be evaluated using a trained ML algorithm to determine whether words or phrases can be classified as directives (e.g. an order vs. a request), questions, answers, or any other type of statement and/or whether a particular tone (authoritative vs. deferential) is associated with the statement to determine whether a participant is expected to actively participate or provide input. This determination may be based on the departing participant's words or actions and/or one or more of the remaining participants' words or actions.

In some embodiments, the server 132 also evaluates other data 308, such as a participant's title or a participant's position among the other participants (e.g. team lead) to determine whether there is an expectation that the participant provide input during the session. For example, if the participant is a team lead of a meeting and the participant has historically made final decisions during meetings, then there is a greater likelihood that the participant is expected to remain in the current session and make similar decisions.

In some embodiments, the presence expectation module 204 determines each remaining participant's individual expectation that the departing participant should remain in the conference session. In some embodiments, each participant's expectation may be tracked on an on-going basis for changes in expectation, which is used for notification purposes, as further described herein.

In some embodiments, each statement and sentiment determined using ML techniques may be associated with a numerical weight such that a lower weight corresponds to a lower expectation of the participant remaining in the conference session while a higher weight corresponds to a higher expectation of the participant remaining in the conference session. In some embodiments, the weighted statements and sentiments are averaged to generate an average weight corresponding to an overall expectation of the participant remaining in the conference session. The weighted statements/sentiments or averaged weighted statements/sentiments are subsequently used for calculating an impact of the participant's departure, as further described herein.

Based on the server's determination of the extent to which a participant has been actively participating or engaged during the session, and whether the participant is expected by other participants to remain in the session, the server 132 determines an impact of the participant leaving the session. In some instances, for example, the server 132 uses the impact module 206 to combine the overall level of participant engagement and the overall expectation of the participant remaining in the conference session to create an impact score. If the impact score exceeds a set threshold amount, then the impact of such a participant leaving is deemed high. If the impact score does not exceed a set threshold amount, then the impact of such a participant leaving is deemed low. In some embodiments, an impact range may be provided (e.g. low, medium, high). In some embodiments, the overall level of participant engagement may be weighted more heavily or less heavily than the overall expectation of the participant remaining in the conference, such that the impact score is influenced by the more heavily weighted factor.

Once the impact score is determined, a notification may be sent, as further described herein.

In some embodiments, the server 132 uses the departure detection module 208 to determine a likelihood of any given participant of a conference session leaving the session early. Any historic or current audio data 302, video data 304, text data 306, and/or other data 308 such as scheduling or calendaring data may be used to determine that certain events which correspond to a need to leave have occurred. For example, a participant of a video conference session may have an overlapping meeting in which they may be the host or an otherwise essential participant. The server 132 may be able to determine that there is an overlapping meeting by virtue of the current session and the overlapping meeting both being scheduled in the same calendaring or scheduling system associated with the server 132, for example. In some embodiments, the departure detection module 208 estimates a moment or condition when the participant is expected to leave, which is used later for notifying others, as further described herein. In another example, a participant may receive a text message stating that there is an emergency situation that requires the participant's attention immediately. In a system such as collaboration system 100 that processes a variety of different forms of communication, the server 132 may evaluate the text message using ML and/or sentiment analysis and determine that there is an emergency that the participant needs to leave for. Any form of past or current communication may be evaluated for scheduled or unscheduled events that may cause a participant to leave a conference session early.

In some embodiments, where little to no data indicates that a scheduled or unscheduled event will cause a participant to leave, the departure detection module 208 may identify a participant's attempt to leave or actual departure. For example, if a participant selects the "Leave Meeting" control in a user interface of a client application to end a video conference session, the departure detection module 208 may detect the user input and determine that the participant is trying to leave. In some embodiments, the departure detection module 208 may determine that a participant has logged off of the conferencing session.

In some embodiments, the discrete events indicating a likelihood of a participant leaving may be assigned numerical weights such that a lower weight corresponds to a lower likelihood of a participant leaving while a higher weight corresponds to a higher likelihood of a participant leaving. In some embodiments, the weight may be used to initiate a departure notification, as further described herein. In some embodiments, a threshold may be assigned such that any likelihood above the threshold triggers or contributes to triggering a departure notification, as further described herein. In instances where a departure has already been detected, the event may be assigned the highest possible weight to trigger a departure notification, in some embodiments.

In some embodiments, as a result of the departure detection module 208 determining that a participant may be leaving and/or the impact module 206 determining that the impact of that participant leaving is high, the notification module 210 will automatically prepare a departure alert that alerts the other participants of the leaving participant's departure or imminent departure. In some embodiments, the notification module 210 will prepare a system-generated default message detailing that the participant needs to leave the session early. In some embodiments, the message details the reason that the participant needs to leave (e.g. to attend another meeting, to address an emergency, pick up their kids from school, etc.), an estimated time that the participant is expected to leave (e.g. the time corresponding to the start of an overlapping or conflicting meeting where the participant is required), or any other details related to the impending departure. In some embodiments, the notification module 210 may prompt the departing participant to provide guidance or instructions on how their early departure should be handled by the server 132 and messaged to the remaining participants in the session. In other embodiments, the message is customizable by the departing participant. In some embodiments, the departing participant may be given an option to suppress the notification. For example, in some embodiments where the participant's imminent departure is anticipated, the notification module 210 may provide a preview of the system-generated departure message to the leaving or likely-to-leave participant. The notification module 210 may provide the departing participant a means to customize or change the explanation message and/or opt to suppress the automatic departure alert behavior.

For example, a participant of a video conference session may receive the following short message service (SMS) text message from their spouse: "Hi, honey . . . my car broke down on the freeway and I'm waiting for AAA to come tow it. Can you please pick up the kids from school?" The collaboration system 100, which may be a unified communication solution that includes native telephony or an integration to a telephony service, may determine that it should automatically prepare a departure alert for the participant, along with a system-generated message regarding the participant leaving the session early to go pick their kids up from school. In some instances, the participant may be given the opportunity to customize or suppress the message.

In some embodiments where a participant leaves without warning, and hence, without the departure detection module 208 anticipating a departure, the notification module 210 may generate, during or after departure, a default message detailing that the participant is leaving or has left. As such, the notification module 210 may send the notification prior to, during, or after the departure. In some embodiments, the notification module 210 may be customized to alert only one or more select participants or only the host of the conference.

For conference sessions where the departure detection module 208 has determined that one or more participants are likely or expected to leave the session early, and where the impact module 206 has determined the impact of those participants leaving early to be sufficiently high, the notification module 210 is configured to provide notifications, alerts, or other indicators in the user interface of the client application 114A, 114B of the conferencing service indicating the participant's departure. In some embodiments, the notification may be a text-based notification, an audio notification, or any other type of notification. For example, the participant's departure may be announced audibly during the conference and/or displayed within the chat feature to one or more of the other participants. In other embodiments, the departure notification may be delivered to one or more of the remaining participants using application pop-up alerts that are displayed for a limited period of time over the user interface of the client application 114A, 114B of the conferencing service (e.g. near the top right corner of the application window). In some embodiments, the departure of a participant may be indicated to one or more remaining participants in the form of an indicator icon displayed alongside the entries of the departed participant in a participants list tab, pane, or window within the client application 114A, 114B. The indicator icon may, in some embodiments, display an explanatory tooltip when a user's mouse pointer hovers over it or the user otherwise inspects or activates the icon. In other embodiments, the departed participants may be displayed in a dedicated section of the participants list tab, pane, or window in which explanations of departure, time of departure, or any other information may be displayed alongside the names of the departed participants.

In some embodiments, the avatar of a departed participant may continue to be displayed during a video conference in a visual state or representation that conveys that the participant is no longer actively participant in the session (e.g. grayed out, dimmed, ghosted, desaturated, etc.). In some embodiments, if a reason or explanation for the participant's departure is available through automatic detection or through participant input, the explanation may be displayed as an overlay text over the departing participant's avatar. In some instances, a countdown to the estimated time of departure is included as an overlay text over the departing participant's avatar or video feed. In some embodiments, the avatar of a participant who has left a session early may be displayed for varying amounts of time following their departure from the session, such as: no amount of time (i.e. removed immediately upon departure), a limited amount of time (e.g. five minutes, ten minutes, etc.), or the remainder of the conference session. In some embodiments, the avatar of a departed participant may be displayed until one or more remaining participants dismiss the avatar from their gallery view or other user interface view of the video conference session. For example, a visual control for closing out a display may be presented as an overlay over the avatar, in the top right corner of the avatar, etc. In some embodiments, the avatar of the departed participant may be displayed until a presenter or host of the session dismisses the avatar from the gallery view for all the participants.

In some embodiments where the presence expectation module 204 has determined each remaining participant's individual expectation for the departing participant to remain, and further determined that none of the remaining participants of the session still have such an expectation (e.g. any participant with such an expectation has left the meeting, the topics of discussion are no longer relevant to the departed participant, etc.), then the notification module 210 may dismiss the avatar of the departed participant from the gallery view automatically.

While the systems and methods detailed above are applied using mostly traditional object-oriented programming methods with some machine learning components, the systems and methods may be also implemented using mostly machine learning.

Figure 4:
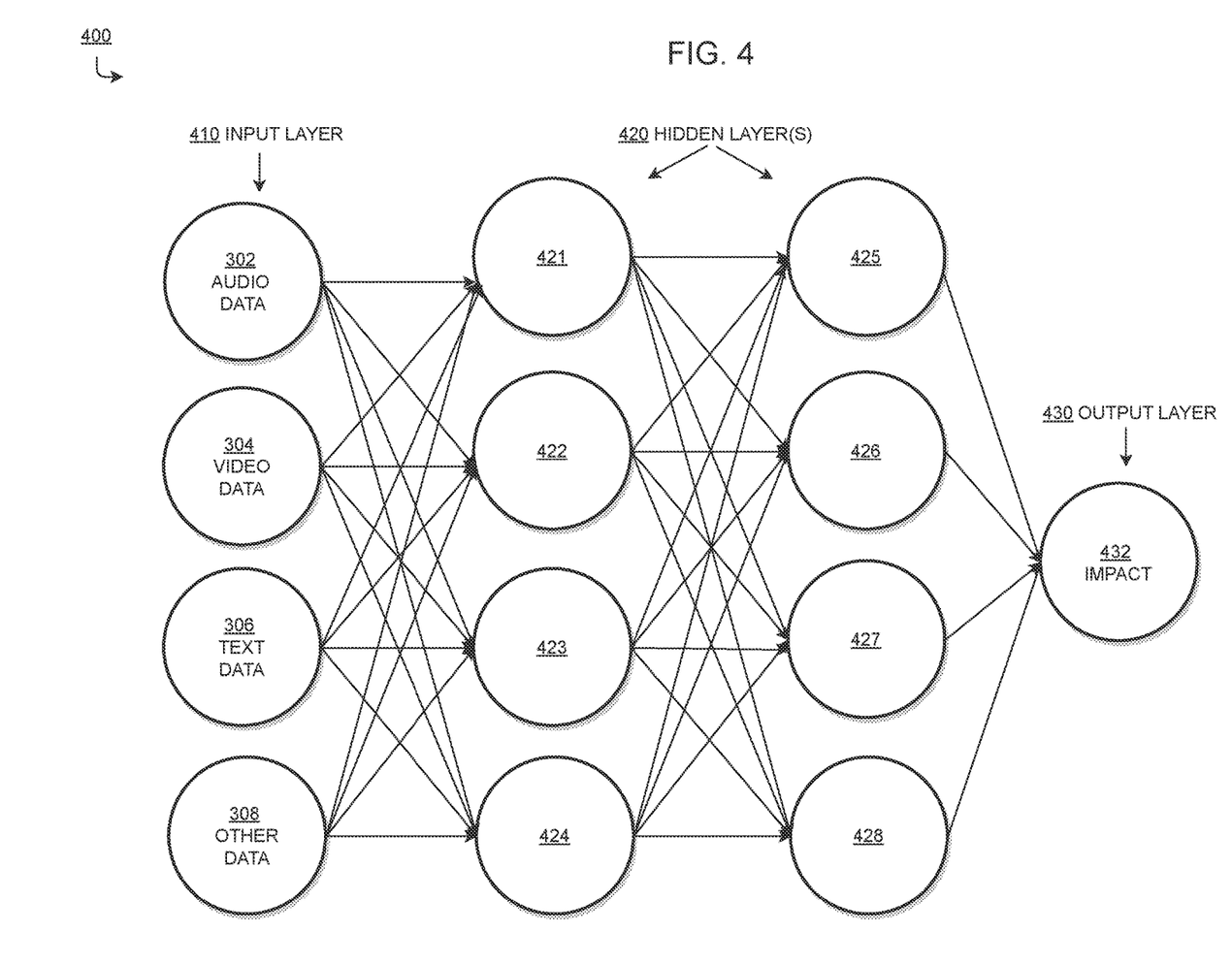
FIG. 4 is a relational node diagram depicting a neural network, in an example embodiment.

In an embodiment, machine learning may be used to determine an impact of a participant leaving a conference session using data such as audio data 302, video data 304, text data 306, and other data 308. Referring to FIG. 4, a neural network 400 may utilize an input layer 410, one or more hidden layers 420, and an output layer 430 to train a machine learning algorithm or model to detect an impact 432 that any given participant's departure would have. Data for the input layer 410 may include audio data 302, video data 304, text data 306, and other data 308, such as scheduling or calendaring data, metadata, or any other data. The output layer 430 includes the identified impact 432, such as a high impact, a low impact, or any other classification of impact. In some embodiments, where data is labeled, supervised learning is used such that known input data, a weighted matrix, and known output data is used to gradually adjust the model to accurately compute the already known output. In other embodiments, where data is not labeled, unstructured learning is used such that a model attempts to reconstruct known input data over time in order to learn.

Training of the neural network 400 using one or more training input matrices, a weight matrix and one or more known outputs is initiated by one or more computers, such as server 132. Once trained, the trained ML algorithm may be used to determine an impact that a participant's departure would have on the conference session. In an embodiment, a computing device may run known input data through a deep neural network 400 in an attempt to compute a particular known output. For example, a server computing device uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computing device then re-computes another output from the deep neural network with the input training matrix and the adjusted weight matrix. This process continues until the computer output matches the corresponding known output. The server computing device then repeats this process for each training input dataset until a fully trained model is generated.

In the example of FIG. 4, the input layer 410 includes a plurality of training datasets that are stored as a plurality of training input matrices in an associated database, such as database 136 of FIG. 2. The training input data includes, for example, audio data 302, video data 304, text data 306, and other data 308 exchanges between participants and/or non-participants. Audio data 302 may be any form of audio communications between participants and/or non-participants. Audio data 302 includes, for example, telephony or voice data, voice recording data, or any other types of audio data. Video data 304 may be any form of video communications between participants and/or non-participants. Video data 304 includes, for example, live streaming video data, stored video files, or any other video data. Text data 306 may be text communications between participants and/or non-participants. Text data 306 includes, for example, Short Message Service (SMS) or Multimedia Messaging Service (MMS) messages, messaging applications messages, collaboration tool messages, e-mail messages, transcriptions, etc. Other data 308 may include data related to any other information, such as scheduling data, calendaring data, third party integration data, or any other data. The example neural network of FIG. 4 is merely representative and is not intended to be exclusive. For example, any number of neural networks may be used in association with any set of training data.

In the embodiment of FIG. 4, hidden layers 420 represent various computational nodes 421, 422, 423, 424, 425, 426, 427, 428. The lines between each node 421, 422, 423, 424, 425, 426, 427, 428 represent weighted relationships based on the weight matrix. As discussed above, the weight of each line is adjusted overtime as the model is trained. While the embodiment of FIG. 4 features two hidden layers 420, the number of hidden layers is not intended to be limiting. For example, one hidden layer, three hidden layers, ten hidden layers, or any other number of hidden layers may be used for a standard or deep neural network. The example of FIG. 4 also features an output layer 430 with impact 432 that any given participant's departure has on the conference session as the known output. As discussed above, in this structured model, the impact 432 is used as a target output for continuously adjusting the weighted relationships of the model.

When the model successfully outputs the correct impact 432, then the model has been trained and may be used to process live or field data.

Once the neural network 400 of FIG. 4 is trained, the trained ML algorithm will accept field data at the input layer 410, such as current audio data 302, video data 304, text data 306, and/or other data 308. In some embodiments, the field data is live data that is accumulated in real time, such as a live streaming video and/or audio of a conference session. In other embodiments, the field data may be current data that has been saved in an associated database, such as database 136. The trained ML algorithm is applied to the field data in order to identify the impact 432 at the output layer 430. For instance, a trained ML model may be fed live conference session data in which a participant's departure may be determined to have a high impact. Once an impact is determined to be high, the notification module 210 may be used to notify the other participants, as described herein.

In some embodiments, the example of FIG. 4 may be used to train a ML algorithm to determine a participant's departure (not depicted). Similar to the impact determination described above, the data for the input layer 410 may include audio data 302, video data 304, text data 306, and other data 308, such as scheduling or calendaring data, metadata, or any other data. The output layer 430 includes an anticipated, imminent, or already-occurred departure of a participant. In some embodiments, the ML algorithm is trained to determine situations where a participant's departure has a high impact and is also anticipated, imminent, or has already occurred. In such situations, the notification module 210 may be used to notify the other participants, as described herein.

4.0 Procedural Overview

Figure 5:
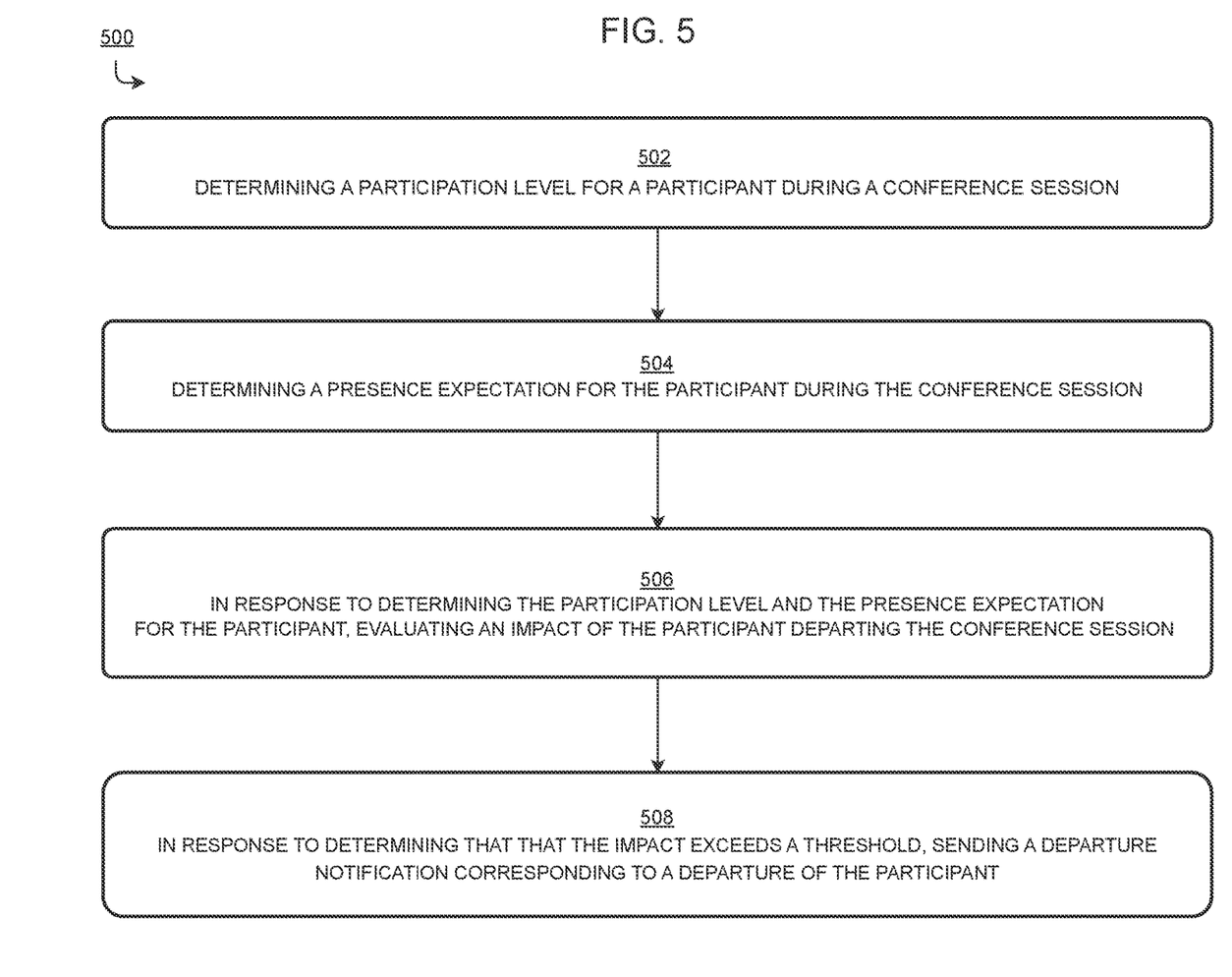
FIG. 5 is a flowchart depicting an impact determination process, in an example embodiment.

FIG. 5 is a flowchart depicting an impact determination process 500, in an example embodiment. In some embodiments, one or more ML algorithms are trained to perform one or more of each step in the process 500. In some embodiments, the server 132 of FIG. 1 is configured to implement each of the following steps in the summary process 500. In other embodiments, a client device 112A, 112B may be configured to implement the steps.

At step 502, a participation level for a participant during a conference session is determined. A participation level indicates the activity or engagement of a participant. The participation level is determined using one or more historic factors and/or current factors, such as the number of times a speaker becomes an active speaker, the numbers of times a participant has spoken, the number of times the participant has been addressed, the amount of time or extent to which the participant has spoken or attracted the focus of the discussion, the amount of time or duration during which the participant has stepped away from a conference, the number of times or a duration during which the participant has shared their screen, and/or the number of messages exchanges. The participation level is determined using numerical weights for each factor, in some embodiments. The numerical weights may be a number assigned between zero and one, between zero and five, or any other numerical scale. In some instances, a lower weight is associated with a lower participation level and a higher weight is associated with higher participation level.

At step 504, a presence expectation for the participant during the conference session is determined. A presence expectation is a likelihood that any given participant is expected, by other participants of the conference session, to remain in attendance or remain engaged in the conference session. The presence expectation is determined using one or more historical factors and/or current factors, such as statements or sentiments surrounding what a departing participant is expected to provide. The statements or sentiments may be made by the departing participant or the other remaining participants. The statements or sentiments may be evaluated using a trained ML algorithm and assign a numerical weight for each statement or sentiment. The numerical weights may be a number assigned between zero and one, between zero and five, or any other numerical scale. In some instances, a lower weight is associated with a lower presence expectation for the departing participant and a higher weight is associated with higher presence expectation for the departing participant.

At step 506, in response to determining the participation level and the presence expectation for the participant, an impact of the participant departing the conference session is determined. An impact of the participant departing the conference session is the degree to which a participant's departure will affect the conference session. The impact is determined by combining the participation level determined in step 502 with the presence expectation determined in step 506 to create an impact score. If the impact score exceeds a set threshold amount, then the impact is deemed high. If the impact score does not exceed a set threshold amount, then the impact is deemed low. In some embodiments, an impact range may be provided (e.g. low, medium, high). In some embodiments, the overall level of participant engagement may be weighted more heavily or less heavily than the overall expectation of the participant remaining in the conference such that the impact score is influenced by the more heavily weighted factor.

In some embodiments, a likelihood of a participant leaving the conference session early is determined. The likelihood of a participant leaving is determined using various types of historic and/or current data, including communication data, scheduling data, user input corresponding to attempts to leave a conference session, data corresponding to an actual departure, or any other types of data. In some embodiments, the discrete events are assigned a numerical weight for each discrete event. The numerical weights may be a number assigned between zero and one, between zero and five, or any other numerical scale. In some instances, a lower weight is associated with a lower likelihood of a participant leaving the conference session while a higher weight is associated with a higher likelihood of a participant leaving the conference session. If the likelihood exceeds a threshold amount, then the likelihood is deemed high. If the likelihood does not exceed a set threshold amount, then the likelihood is deemed low.

At step 508, in response to determining that the impact of the participant departing the conference session exceeds a threshold, a departure notification corresponding to a departure of the participant is sent. The impact score determined at step 506 is compared with its set threshold value. In some embodiments, the likelihood of a participant leaving is compared with its set threshold value. The respective threshold values for impact and the need to leave may be set automatically by the server 132 or by user input. In some embodiments, if the impact score and the likelihood of leaving exceed their respective thresholds, then a departure notification is sent. In some embodiments, the departure notification is sent before the departure while in other embodiments, the departure notification is sent after the departure. In some embodiments, the departing participant customizes the departure notification to include an explanation. In other embodiments, the departure notification automatically includes a determined explanation. In some embodiments, the departure notification is a default notification. The act of sending the departure notification includes, in some instances, causing to display visual indicators or text in a client application of a client device and/or causing to play audio notifications in the client application of a client device.

Figure 6:
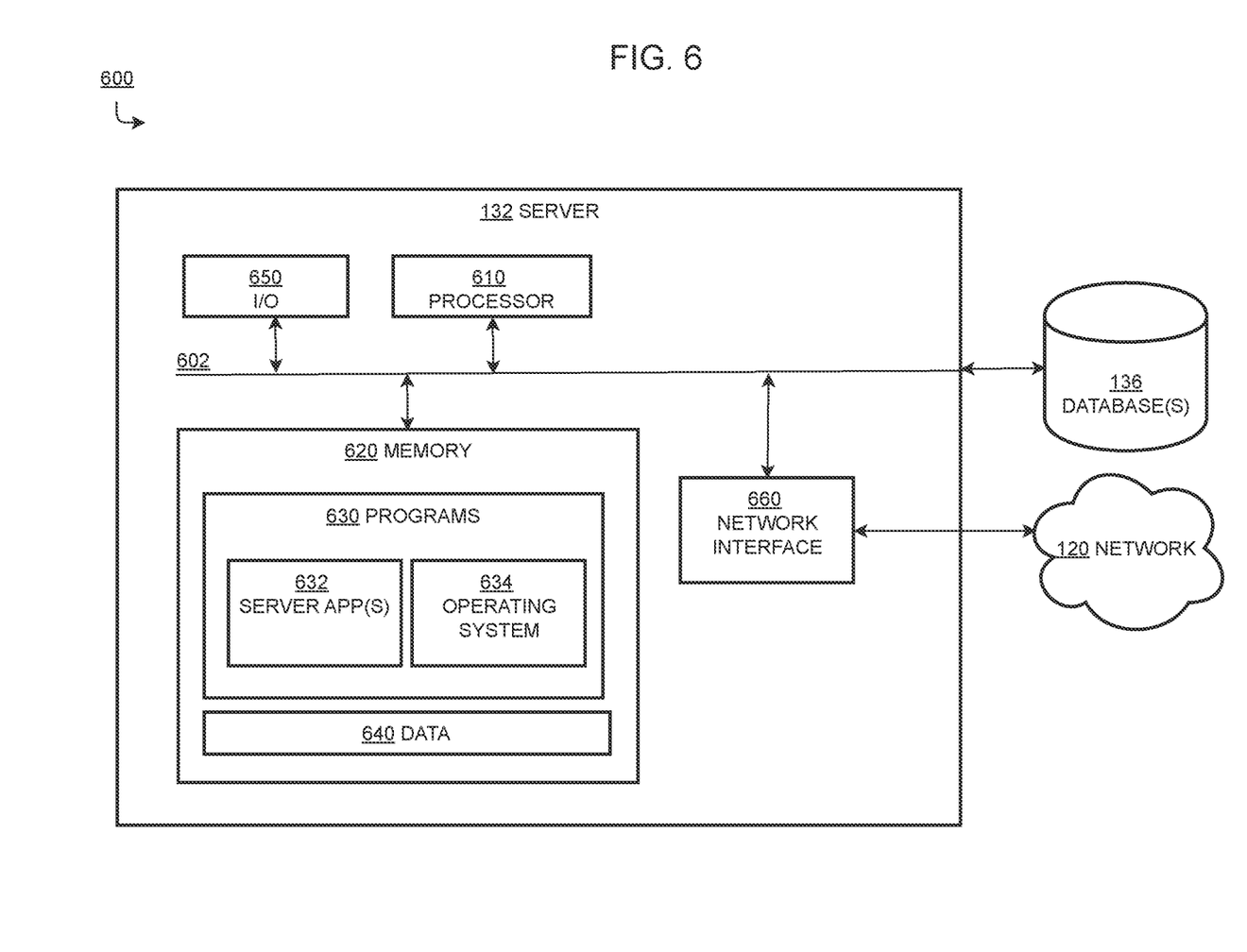
FIG. 6 is a diagram of a conference server, in an example embodiment.

FIG. 6 shows a diagram 600 of an example conference server 132, consistent with the disclosed embodiments. The server 132 may include a bus 602 (or other communication mechanism) which interconnects subsystems and components for transferring information within the server 132. As shown, the server 132 may include one or more processors 610, input/output ("I/O") devices 650, network interface 660 (e.g., a modem, Ethernet card, or any other interface configured to exchange data with a network), and one or more memories 620 storing programs 630 including, for example, server app(s) 632, operating system 634, and data 640, and can communicate with an external database 136 (which, for some embodiments, may be included within the server 132). The server 132 may be a single server or may be configured as a distributed computer system including multiple servers, server farms, clouds, or computers that interoperate to perform one or more of the processes and functionalities associated with the disclosed embodiments.

The processor 610 may be one or more processing devices configured to perform functions of the disclosed methods, such as a microprocessor manufactured by Intel™ or manufactured by AMD™. The processor 610 may comprise a single core or multiple core processors executing parallel processes simultaneously. For example, the processor 610 may be a single core processor configured with virtual processing technologies. In certain embodiments, the processor 610 may use logical processors to simultaneously execute and control multiple processes. The processor 610 may implement virtual machine technologies, or other technologies to provide the ability to execute, control, run, manipulate, store, etc. multiple software processes, applications, programs, etc. In some embodiments, the processor 610 may include a multiple-core processor arrangement (e.g., dual, quad core, etc.) configured to provide parallel processing functionalities to allow the server 132 to execute multiple processes simultaneously. It is appreciated that other types of processor arrangements could be implemented that provide for the capabilities disclosed herein.

The memory 620 may be a volatile or non-volatile, magnetic, semiconductor, tape, optical, removable, non-removable, or other type of storage device or tangible or non-transitory computer-readable medium that stores one or more program(s) 630 such as server apps 632 and operating system 634, and data 640. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The server 132 may include one or more storage devices configured to store information used by processor 610 (or other components) to perform certain functions related to the disclosed embodiments. For example, the server 132 includes memory 620 that includes instructions to enable the processor 610 to execute one or more applications, such as server apps 632, operating system 634, and any other type of application or software known to be available on computer systems. Alternatively or additionally, the instructions, application programs, etc. are stored in an external database 136 (which can also be internal to the server 132) or external storage communicatively coupled with the server 132 (not shown), such as one or more database or memory accessible over the network 120.

The database 136 or other external storage may be a volatile or non-volatile, magnetic, semiconductor, tape, optical, removable, non-removable, or other type of storage device or tangible or non-transitory computer-readable medium. The memory 620 and database 136 may include one or more memory devices that store data and instructions used to perform one or more features of the disclosed embodiments. The memory 620 and database 136 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the server 132 may be communicatively connected to one or more remote memory devices (e.g., remote databases (not shown)) through network 120 or a different network. The remote memory devices can be configured to store information that the server 132 can access and/or manage. By way of example, the remote memory devices could be document management systems, Microsoft SQL databases, SharePoint databases, Oracle™ databases, Sybase™ databases, or other relational databases. Systems and methods consistent with disclosed embodiments, however, are not limited to separate databases or even to the use of a database.

The programs 630 may include one or more software modules causing processor 610 to perform one or more functions of the disclosed embodiments. Moreover, the processor 610 may execute one or more programs located remotely from one or more components of the collaboration system 100. For example, the server 132 may access one or more remote programs that, when executed, perform functions related to disclosed embodiments.

In the presently described embodiment, server app(s) 632 causes the processor 610 to perform one or more functions of the disclosed methods. For example, the server app(s) 632 may cause the processor 610 to analyze different types data, such as audio data, video data, text data, or other data, to determine an impact of a participant leaving a conference session, and upon detecting an imminent or actual departure, sending a notification of the departure. In some embodiments, other components of the collaboration system 100 may be configured to perform one or more functions of the disclosed methods. For example, client devices 112A, 112B may be configured to determine an impact of a participant leaving a conference session, and upon detecting an imminent or actual departure, sending a notification of the departure.

In some embodiments, the program(s) 630 may include the operating system 634 performing operating system functions when executed by one or more processors such as the processor 610. By way of example, the operating system 634 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, disclosed embodiments may operate and function with computer systems running any type of operating system 634. The server 132 may also include software that, when executed by a processor, provides communications with network 120 through the network interface 660 and/or a direct connection to one or more client devices 112A, 112B.

In some embodiments, the data 640 includes, for example, audio data, video data, text data, or other data.

The server 132 may also include one or more I/O devices 650 having one or more interfaces for receiving signals or input from devices and providing signals or output to one or more devices that allow data to be received and/or transmitted by the server 132. For example, the server 132 may include interface components for interfacing with one or more input devices, such as one or more keyboards, mouse devices, and the like, that enable the server 132 to receive input from an operator or administrator (not shown).

What is claimed is:

1. A computer-implemented method for improving conferencing sessions, the method comprising:
   determining a participation level for a participant during a conference session;
   determining a presence expectation for the participant during the conference session;
   in response to determining the participation level and the presence expectation for the participant, evaluating an impact of the participant departing the conference session; and
   in response to determining that the impact exceeds a threshold, sending a departure notification corresponding to a departure of the participant.

2. The computer-implemented method of claim 1, further comprising:
   receiving a departure explanation from the participant; and
   wherein sending the departure notification comprises sending the departure explanation.

3. The computer-implemented method of claim 1, further comprising:
   determining a departure explanation for the participant; and
   wherein sending the departure notification comprising sending the departure explanation.

4. The computer-implemented method of claim 1, further comprising:
   determining a departure likelihood for the participant; and
   in response to determining that the departure likelihood exceed a threshold, sending the departure notification.

5. The computer-implemented method of claim 1, wherein sending the departure notification comprises sending the departure notification prior to, during, or after the departure.

6. The computer-implemented method of claim 1, wherein sending the departure notification comprises sending a default departure notification.

7. The computer-implemented method of claim 1, wherein the departure notification comprises text or audio.

8. A non-transitory, computer-readable medium storing a set of instructions that, when executed by a processor, cause:
   determining a participation level for a participant during a conference session;
   determining a presence expectation for the participant during the conference session;
   in response to determining the participation level and the presence expectation for the participant, evaluating an impact of the participant departing the conference session; and
   in response to determining that the impact exceeds a threshold, sending a departure notification corresponding to a departure of the participant.

9. The non-transitory, computer-readable medium of claim 8 storing further instructions that, when executed by a processor, cause:
   receiving a departure explanation from the participant; and
   wherein sending the departure notification comprises sending the departure explanation.

10. The non-transitory, computer-readable medium of claim 8 storing further instructions that, when executed by a processor, cause:
    determining a departure explanation for the participant; and
    wherein sending the departure notification comprising sending the departure explanation.

11. The non-transitory, computer-readable medium of claim 8, storing further instructions that, when executed by a processor, cause:
    determining a departure likelihood for the participant; and
    in response to determining that the departure likelihood exceeds a threshold, sending the departure notification.

12. The non-transitory, computer-readable medium of claim 8, wherein sending the departure notification comprises sending the departure notification prior to, during, or after the departure.

13. The non-transitory, computer-readable medium of claim 8, wherein sending the departure notification comprises sending a default departure notification.

14. The non-transitory, computer-readable medium of claim 8, wherein the departure notification comprises text or audio.

15. A system for improving conferencing sessions, the system comprising:
    a processor;
    a memory operatively connected to the processor and storing instructions that, when executed by the processor, cause:
       determining a participation level for a participant during a conference session;
       determining a presence expectation for the participant during the conference session;
       in response to determining the participation level and the presence expectation for the participant, evaluating an impact of the participant departing the conference session; and
       in response to determining that the impact exceeds a threshold, sending a departure notification corresponding to a departure of the participant.

16. The system of claim 15, wherein the memory stores further instructions that, when executed by the processor, cause:
    receiving a departure explanation from the participant; and
    wherein sending the departure notification comprises sending the departure explanation.

17. The system of claim 15, wherein the memory stores further instructions that, when executed by the processor, cause:
    determining a departure explanation for the participant; and
    wherein sending the departure notification comprising sending the departure explanation.

18. The system of claim 15, wherein the memory stores further instructions that, when executed by the processor, cause:
    determining a departure likelihood for the participant; and
    in response to determining that the departure likelihood exceeds a threshold, sending the departure notification.

19. The system of claim 15, wherein sending the departure notification comprises sending the departure notification prior to, during, or after the departure.

20. The system of claim 15, wherein sending the departure notification comprises sending a default departure notification.

\* \* \* \* \*